United States Patent [19]
Finkelstein et al.

[11] Patent Number: 5,586,099
[45] Date of Patent: Dec. 17, 1996

[54] OPTIMIZED LASER READ POWER BASED UPON SCAN SPEED OF OPTICAL MEDIUM AND ERASURE CHARACTERISTICS OF THE MEDIUM

[75] Inventors: Blair I. Finkelstein, Tucson, Ariz.; Michael R. Madison, Los Gatos, Calif.

[73] Assignee: International Business Machines Corporation, Armonk, N.Y.

[21] Appl. No.: 446,155

[22] Filed: May 22, 1995

[51] Int. Cl.$^6$ .................................................. G11B 7/00
[52] U.S. Cl. .................................. 369/116; 369/32
[58] Field of Search ........................... 369/116, 32, 54, 369/58, 48, 44.32

[56] References Cited

U.S. PATENT DOCUMENTS

| | | | |
|---|---|---|---|
| 4,334,301 | 6/1982 | Kanamaru | 369/116 |
| 4,685,097 | 8/1987 | van der Put | 369/54 |
| 4,763,134 | 8/1988 | Murahashi et al. | 346/1.1 |
| 4,813,034 | 3/1989 | Mashimo | 369/116 |
| 4,908,815 | 3/1990 | Gregg et al. | 369/116 |
| 4,937,809 | 6/1990 | Miyadera et al. | 369/116 |
| 4,949,329 | 8/1990 | Forman et al. | 369/116 |
| 5,134,606 | 7/1992 | Sekiguchie et al. | 369/116 |
| 5,185,733 | 2/1993 | Finkelstein et al. | 369/116 |
| 5,276,670 | 1/1994 | Nogami et al. | 369/116 |
| 5,303,222 | 4/1994 | Matsueda | 369/116 |
| 5,315,402 | 5/1994 | Ito et al. | 369/116 |
| 5,392,273 | 2/1995 | Masaki et al. | 369/116 |
| 5,467,337 | 11/1995 | Matsumoto | 369/116 |

FOREIGN PATENT DOCUMENTS

| | | | |
|---|---|---|---|
| 0153542 | 11/1981 | Japan | 369/116 |
| 0084354 | 5/1984 | Japan | 369/116 |
| 0231747 | 12/1984 | Japan | 369/116 |

*Primary Examiner*—Nabil Hindi
*Attorney, Agent, or Firm*—D. A. Shifrin; H. F. Somermeyer

[57] ABSTRACT

A laser read beam power level is increased with increasing radii and decreased with decreasing radii of scanning a spiral track in an optical disk. The change of read beam power level is adjusted in accordance with an established erasure profile. The erasure profile indicates beam power level at various radii at which recorded data are erased, such as in a magneto-optical disk. Read beam power level is adjusted from a pre-established minimum read beam power level (used at an inner disk radius) following the erasure profile. This action maximizes read power level without exceeding the erasure profile indicated power levels. Radial ranges are established for reading from the optical disk. Within each range, the laser beam read power level is kept constant, preferably at the desired power level at an radially innermost portion of the respective range. Optical disks have the minimum laser read beam power level and an erasure profile recorded therein.

26 Claims, 3 Drawing Sheets

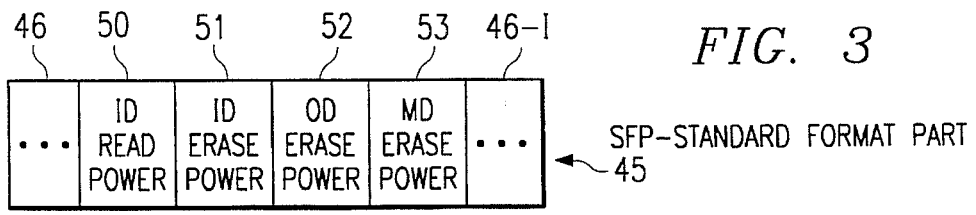
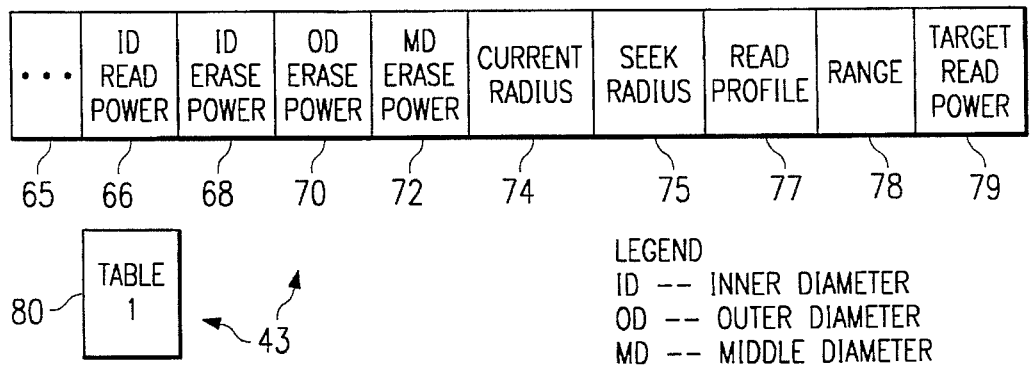
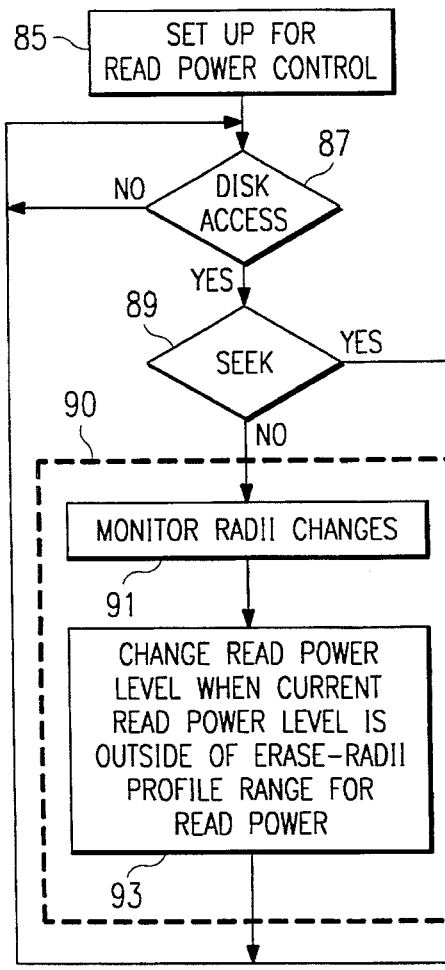

OPTIMIZED LASER READ POWER BASED UPON SCAN SPEED OF OPTICAL MEDIUM AND ERASURE CHARACTERISTICS OF THE MEDIUM

DOCUMENT INCORPORATED BY REFERENCE

Jaquette et al U.S. Pat. No. 5,293,565 is incorporated by reference.

FIELD OF THE INVENTION

The present invention relates to laser controls and more particularly to controlling solid state lasers during a read mode of an optical disk drive.

BACKGROUND OF THE INVENTION

Lasers, particularly solid state lasers, have been used for years for recording and reading or sensing data on optical media. It has also been found that while reading from an optical disk of the rewriteable type, either reading data or sensing track crossings during a seek to a track operation, unintended partial or complete erasure occurs if the laser read power level is too high. Further, the operating parameters of media vary from one medium to the next; such variations are significant when using so-called removable optical media. It is desired to provide for enhanced read and seek operations while avoiding such inadvertent erasure.

A rotating disk has a lower linear speed at its inner diameter ID than at its outer diameter OD. As a result in the different speeds of scanning linearly along data tracks at different disk radii, using a constant laser power level results in greater heating and a higher temperature at the ID than the OD. Therefore the risk of inadvertent erasure at the disk ID is greater than at the disk OD. To accommodate this unintended data erasure exposure, it is a current practice to set read power levels at the ID. As a result of this read power level selection, the effective read power level at the OD is less than at the ID. It has been noticed by the inventors that such reduced effective read power level may result in a poorer quality read back signal. Accordingly, it is desired to provide a simple, yet reliable, method and apparatus for effecting improved read back from optical disks in areas remote from the ID while not having an unintended erasure exposure at the inner radii of the optical disk.

DISCUSSION ABOUT PRIOR ART

It is known to change recording or write laser power with disk radii for increasing emitted laser power level at outer recording areas of the disk. U.S. Pat. Nos. 4,813,034 and 4,937,809 show two such systems. Both systems appear to be based on merely changing laser power with radial position while either using laser feedback or also changing laser duty cycle with radii. While these systems may improve the recorded signal quality, it appears that read back quality may still suffer independently of enhanced recording.

Other examples of radii-induced recording changes are in Japanese patent-application publications 59-84354, 59-231747 and 56-153542.

SUMMARY OF THE INVENTION

It is an object of this invention to enhance read back of optical disks through erasure-power-level-controlled changes of laser read power level with radial position of the optical read sensor with respect to the disk.

A rate of change in required erasure power level with track scanning speed (disk radii) is applied to read power level for changing read power level with scanning speed. Increasing scan speed increases erasure power level, hence increases read power level in a similar degree or profile of erasure power level change. A profile of the required erasure power level with scan speed is generated such that any non-linear change in erasure power with scan speed is easily applied to changing read power level using the same profile with speed. Using the erasure profile as a laser read power level profile ensures against unintended erasure at low media scanning speeds while enabling higher laser read power levels at high media scanning speeds. Increasing laser read power level with scan speed enables maintaining a minimum energy level throughout the media extent for enhancing read back while not exceeding an erasure level of energy.

Many optical disk media contain indications, in a standard format part (SFP) area of the optical disk, of inner diameter (lowest scan speeds) read and multiple erase power levels. Such media indicate erase power levels at the outer diameter and at a middle diameter (MD). Included in establishing a read power level profile with scan speeds (disk radii), a erasure-speed (radii) profile is first determined. Such profile may be a per cent change from ID to OD of the required erasure power level change. This erasure profile per cent change is applied to the inner diameter laser read power level to obtain an OD laser power level. Laser read power levels for tracks between the ID and OD may be extrapolated from the ID laser read level or interpolated between the ID and OD laser read power levels. Other erasure profiles, such as a logarithmic profile are also used.

The foregoing and other objects, features and advantages of the invention will be apparent from the following more particular description of preferred embodiments of the invention, as illustrated in the accompanying drawings.

DESCRIPTION OF THE DRAWINGS

FIG. 3 diagrammatically illustrates exemplary data structures usable with the FIG. 1 illustrated embodiment.

FIGS. 4 and 5 are simplified flow charts of machine operations shown practicing the present invention in the FIG. 1 illustrated embodiment.

DETAILED DESCRIPTION

Figure 1:
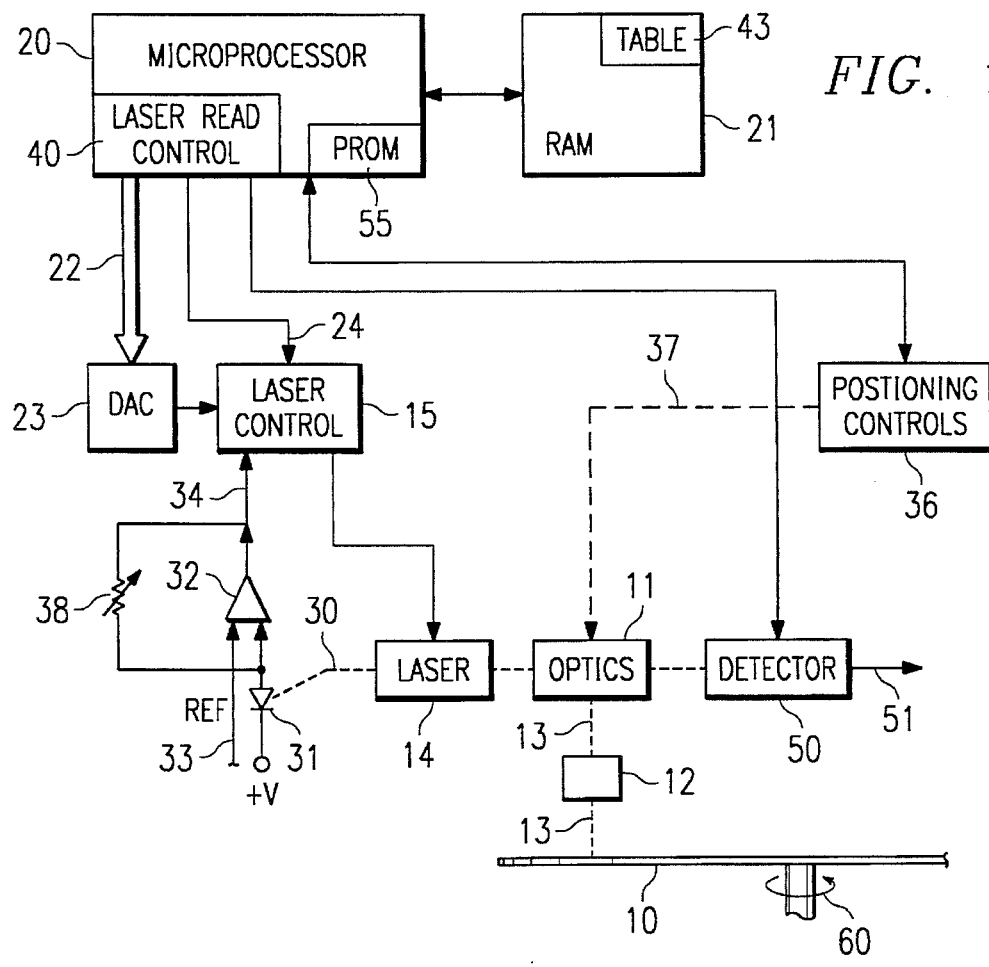
FIG. 1 is a simplified block-diagrammatic showing of an optical disk drive employing the present invention.

Referring now more particularly to the appended drawings, like numerals indicate like parts and structural features in the various Figures. A magneto-optical disk 10 is suitably removably mounted for rotation in an optical disk drive (mechanical details not shown). Other types of optical media may also be employed while practicing the present invention. An optical system 11 which includes the usual beam splitters, and the like, supplies a light beam through objective lens 12 over light path 13 and receives reflected light from removeably-mounted disk 10 over the same path and objective lens 12. Solid-state laser 14 supplies a light beam through optics 11 to disk 10 as controlled by laser control 15, as will become apparent. The FIG. 1 illustrated drive-drive is under control of a programmed microprocessor 20 that has random access memory (RAM) 21. Microprocessor 20 supplies a digital value over cable 22 to digital to analog converter (DAC) 23. DAC 23 supplies an analog signal to laser control 15 for determining the beam intensity emitted by laser 14 to optics 11. Such laser output light beam may include modulation based upon data as supplied by microprocessor 20, or other data handling circuits. For reading data and for counting tracks being crossed during a so-called head seek, laser 14 emits a beam having an intensity determined by a later-described erasure beam intensity profile. Line 24, extending from microprocessor 20 to laser control 15, signifies additional mode control for controlling the laser control circuits 15, all as will become apparent.

Laser 14 is controlled in intensity by a feedback circuit in laser control 15. Laser 14 emits an auxiliary beam over light path 30 to a photo diode 31. Photo diode 31 varies the photo current amplitude in accordance with the laser 14 emitted light over path 30, as is known. Transimpedance amplifier 32 responds to the diode 31 changed current amplitude compared with a reference value on line 33 to supply signals over line 34 indicative of laser 14 output beam intensity. Potentiometer 38 adjusts the gain of transimpedance amplifier for achieving a target read output power level. This adjustment effects a calibrated signal level on line 34 in volts per watts. As a result, the signal level on line 34 represents absolute light power output of laser 14. Laser control 15, under normal operations, responds to the signal level on line 34 to maintain the laser 14 operation at predetermined intensity values, as is known.

Positioning controls 36 control position objective lens with respect to radial positions of disk 10, all as is known. Dashed line 37 indicates a servo-mechanism control and connection between positional controls 38 and objective lens 12 for positioning light beam 13 with respect to optical disk 10 in a usual manner.

In accordance with the invention, laser read control 40 controls intensity of the laser 14 emitted beam using an erasure power level profile with respect to scanning speed. This control increases the emitted laser beam intensity with increases in scanning speed. The increase in laser read power follows the erasure power-level profile with scanning speed. As a part of the control a table area 43 in RAM 21 contains control data related to laser control, all as best seen in FIG. 3.

The laser read control 40, as later described, supplies numerical values over cable 22 to thereby cause DAC 23 to actuate laser 14 to change laser 14 emitted read power levels in accordance with this invention. It is to be understood that microprocessor 20 also controls all other aspects of the illustrated optical disk drive. For example, detector 50 which detects the data sensed from medium 10 is also controlled to supply the data signals over line 51 as is well known. Detector 50 is an optical detector which is optically coupled through optics 11.

Figure 2:
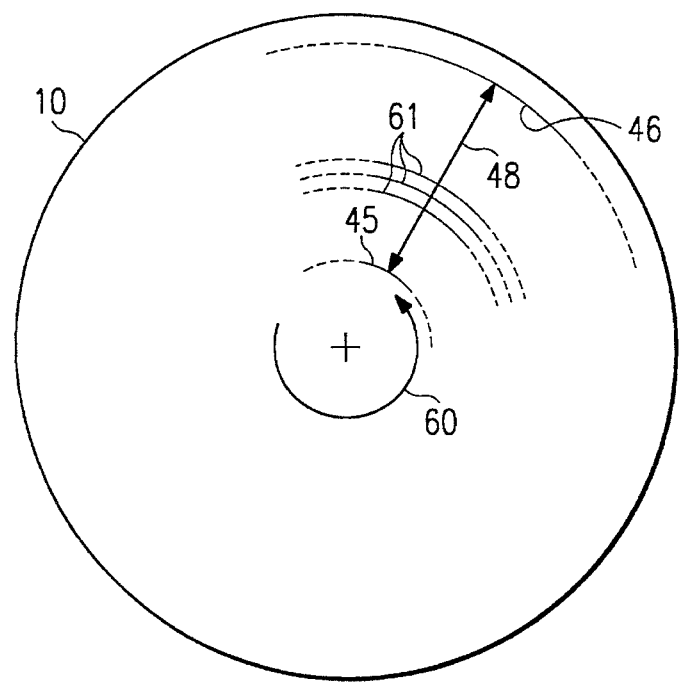
FIG. 2 is a diagrammatic showing of an optical disk on which power level and control level information is recorded which is usable with the FIG. 1 illustrated embodiment.

FIG. 2 is a simplified diagrammatic plan view of magneto-optical disk 10 having an standard format part SFP identical optical disk 10 recording track areas 45 and 46, respectively at the disk 10 ID and OD. Double-headed arrow 48 indicates the recording area for data between SFP areas 45 and 47. SFP areas 45 and 46 each identically and indelibly (embossed recording) store nominal (recommended laser intensity) values for use in recording, erasing, and reading from the disk 10. SFP 45, shown in FIG. 3, has track areas 46 that store parameter data not pertinent to the present invention. ID read power level area 50 stores a recommended minimum read power level that at the ID portion of recording area indicated by numeral 48 will not unintentional erase MO recorded data. SFP 45 track areas 51–53 respectively store recommended values for laser erase power levels respectively at the ID, OD and middle diameter (MD) of disk 10. Such numerical values can be provided at time of manufacture for disk 10 and used by microprocessor 20 to calculate the DAC 23 digital input values for given laser output power levels for operating with a particular individual disk.

Whenever a disk 10 having laser power information in SFP areas 45 and 46 is mounted for reading and writing in the FIG. 1 illustrated disk player, that information is copied into table 43. Microprocessor 20 uses such copied SFP information for controller laser 14, inter alia. In accordance with this invention, laser read power is automatically adjusted with scanning speed (disk radii) and an erasure power profile. Using the erasure power profile ensures that increasing the laser read power with scan speed does not inadvertently erase magneto-optical recording. Such increase in laser read power is preferred to reestablish a desired or indicated minimum laser read power at a plurality of radii of a disk. Such minimum laser read power is specified to occur at the inner diameter ID of the disk whereat scan speed is slowest, hence energy level per bit position (one unit of scan distance in the spiral track 61) is highest. Raising the laser read power to generate a minimal read energy level a predetermined radii enhances read back of recorded data on the disk. Such recorded data may be embossed (read only), magneto-optical, etc. In later-described seek operations, such data are spiral track 61 crossings.

In another aspect of the present invention, at time of manufacturing, SFP areas 45 and 46 receive and store the erasure power profile and a recommended laser read power profile in an area 46-I of the FIG. 3 illustrated SFP format. In another variation, for those data storage systems always employing the same optical disks, such as in a library, PROM 55 stores the laser read profile for all optical disks in the library (not shown). For libraries having diverse types of optical disks, PROM 55 stores multiple laser read profiles along with identification of storage of the respective disks. This arrangement avoids reading SFP area 45 or 46 each time an optical disk is mounted in an optical drive.

Optical disk 10 (FIG. 2) rotates in the direction of arrow 60. Objective lens 12, hence light path 13, is automatically positioned by positioning control 36 to scan portions of spiral track 61, partially shown in FIG. 2. Such spiral track is in the form of a spiral groove or land between the groove of two radially-adjacent revolutions of the spiral track. It is also preferred that optical disk 10 use a format as set forth in the Jaquette et al U.S. Pat. No. 5,293,565. The Jaquette et al described format having multiple radial bands of addressable tracks in a plurality of disk revolutions of a spiral track. A radial extent of each band may be selected to enable using one laser power level per band, no limitation thereto intended.

FIG. 3 illustrates the table 43 partial copy of SFP area 45 or 46 read information. Area 65 stores SFP and other control information not pertinent to the present invention. The read ID read power resides in field 66, ID erase power in field 68, OD erase power in field 70 and MD erase power in field 72. Additionally, the later-described values of current radial location are stored in current radius field 74, target seek radius in seed radius field 75, generated erasure-power-profile-based laser read profile in read profile field 77 and acceptable range of laser read power variations in range field 78. When the laser read profile is linear with respect to radii, range field 78 may contain a radii range to represent an acceptable range of variations of the laser read power. Table 180 is a table of radii values illustrating radii of the above-mentioned Jaquette et al preferred disk 10 format.

FIG. 4 illustrates, in simplified and diagrammatic form, general machine operations for implementing the invention in a best mode in the FIG. 1 illustrated optical drive. Microprocessor 20 effected machine step 85 sets up the optical drive for laser read power control. This machine step may include reading an SFP area 45 or 46. Machine step 85 includes indicating a laser read power profile as a part of practicing the present invention. Completion of machine step 85 prepares the optical drive to use the present invention. Machine step 87 checks whether or not a disk 10 access is to occur. Such disk 10 access includes automatic calibration, diagnostic and testing of the optical drive or optical disk 10, seek operations to a target addressed track and data-related accesses. Such data-related accesses are read, erase and write. As long as no disk 10 access is to be performed, then there is no need for checking or adjusting the read laser power level. Upon each upcoming disk 10 access, machine step 89 determines whether the access is for a seek operation (move from a current radial position indicated in current radius field 74 to a target radial position indicated in seek radius field. If the upcoming disk access is not a seek, then objective lens 12 emitted beam over path 13 will scan a portion of spiral track 61, such as for reading, erasing or writing from or to optical disk 10. Machine step 90 monitors changes in the radial position of for changing laser read power level as need. Within machine step 90, machine step 91 monitors radii changes for determining if a change in laser 14 emitted beam intensity is needed. Machine step 91 repeatedly sends monitored radii values to be used by machine step 93. Machine step 93 combines the range field 78 value, current radius field 74 value (radius at which laser read power level is currently set for) with a monitored radius value for determining whether or not a change in laser 14 emitted read power level is needed. As soon as machine step 93 finds a needed change, then machine step 93 changes the laser read power level using the read profile field 77 stored value. Upon machine step 93 completing each read power level change, that may or may not be sent to DAC 42, steps 87 et seq are repeated until the disk access is completed. Then the steps quiesce until a next disk 10 access.

If machine step 89 detects that the disk 10 access is for seeking from a current radial position of to a target radial position, then machine step 105 updates the laser read power level to the target radial position. Within machine step 100, machine step 101 determines whether or not laser read level is to be adjusted while seeking to the target radius (target revolution of spiral track 61). In this regard, an apriori decision may dispense with adjusting read laser power level while seeking to a target radius. This apriori decision was designed into some embodiments of this invention. Such apriori decision causes machine operations to proceed over path 104 to read power updating machine step 105. Machine step 105, while light path 13 is moving to a target radius during a seek operation, updates the read power level as described with respect to FIG. 5. The target laser read power level is stored in target read power field 79 of table 43. DAC 42 is not updated at this time.

Machine step 105 determines that the target radius has been reached. At this point, machine step 105 updates DAC 43 with the target read power level. Machine step 105 then erases field 79 and updates current radius field 74. While microprocessor 20 may read the digital setting of DAC 43 to obtain the current setting for read power level, the current DAC setting is also stored in field 74 with the current radius value. Of course, in a linear read profile, the current radius value is a linear indication of a respective read power level DAC 43 setting. When using a non-linear read power profile, the relationship between the current radius value in field 74 and the current read power level value may not be so apparent.

If at machine step 101, it is desired to modify read power level with radius during a seek, then machine step 108 monitors radial position changes of path 13 laser beam. While the seek is at a maximum constant radial speed, then laser read power may be changed. During such maximum radial speed portion of a seek operation, a change in laser read level power may not be interruptive of counting revolution crossings that indicate radial position of the laser beam on path 13. In some servo positioning systems, while movement is at a constant radial speed, rather than sensing revolution crossings (indicated by the known spiral groove in an optical disk that defines the spiral track), the revolution count is effected by circuits that count such crossings based on radial speed. During this portion of a seek, changing laser read power level would not introduce noise into the read back signal generated by radially scanning successive groove crossings of the path 13 laser beam. While accelerating at the beginning of a seek and while decelerating at the end of a seek, no power level changes are made. At the end of the constant speed seek portion, the onset of the deceleration portion to the target radial position, machine step 108 actuates machine step 105 via path 104 to compute the ultimate laser read power level for the end of the seek. Such calculation is preferred to be based upon the initial and target radial positions rather than the radial position at which the deceleration portion begins. After completing each change in laser read power level by sending an updating laser read power level value to DAC 43, step 87 is re-entered for repeating the above-described machine steps until the end of the disk access. It should also be noted that during write and erase operations, so-called sector ID's are read. This fact means that during such erase and write operations microprocessor 20 changes DAC 43 values between laser read levels and the erase and write laser intensity values. Such interleaving follows known techniques for switching between reading and erasing or writing. The above described read beam level changing machine operations are interleaved between the erase and write operations for updating laser 14 emitted beam read levels. This requirement arises out of the format of disk 10 sectors. Each such sector having, inter alia, a data portion and a sector ID portion. While the data portion may be erased, written to or read, the sector ID is always read.

Figure 5:
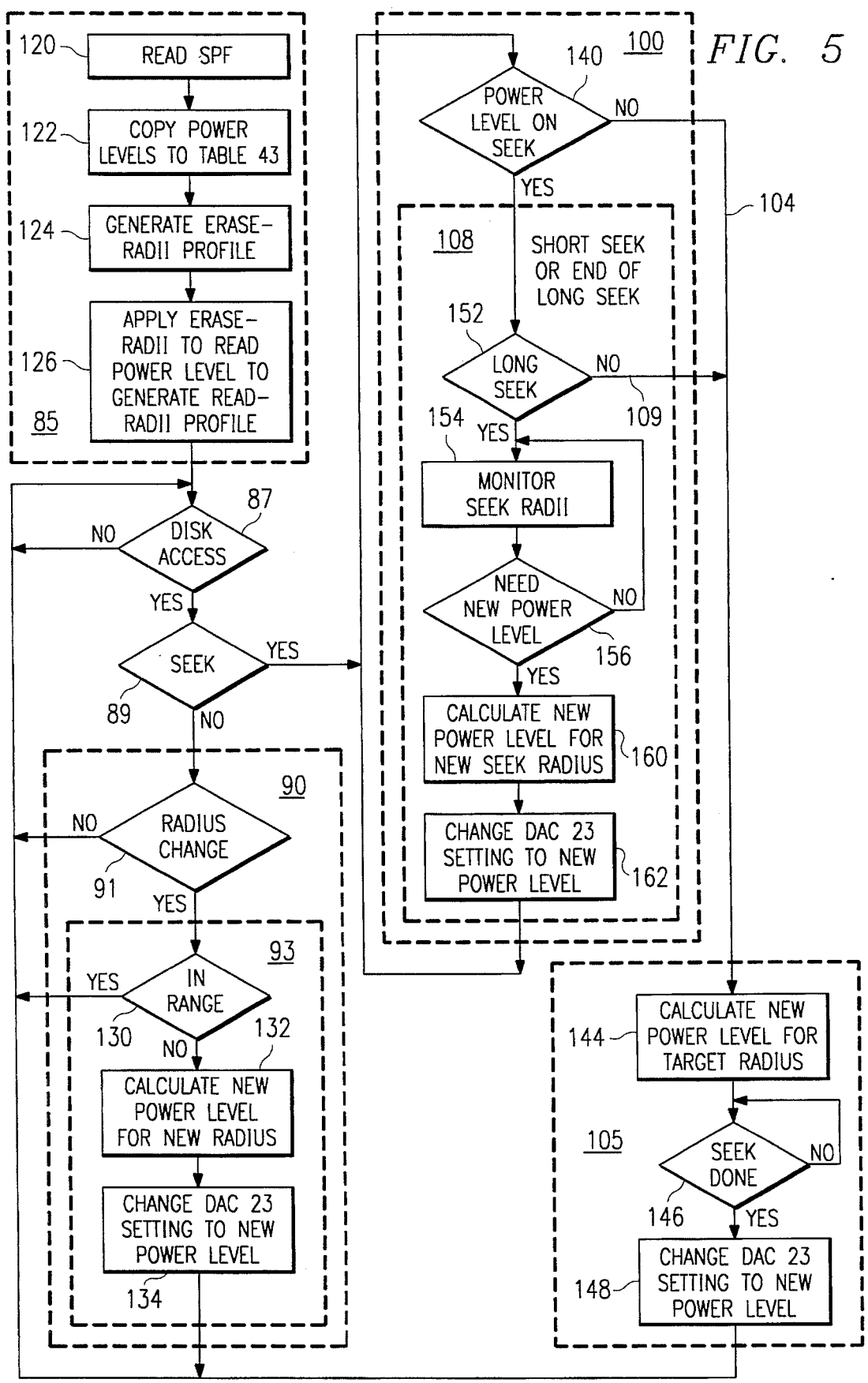

Referring next to FIG. 5, more detail of the machine operations are described. Machine step 85 includes a plurality of smaller machine steps for copying SFP area 45 or 46 data from each just-mounted optical disk 10 into table 43. Machine step 120 accesses SFP area 45 (or area 46) for reading the FIG. 3 illustrated fields 46 and 50–53. In a library (not shown) environment field 46-I is also read. Machine step 122 then copies the read SFP data into table 43 as fields 65–72. In the case of a library, field 77 receives the field 46-I read profile.

In a non-library environment or in a library environment not storing a read profile on a disk, machine step 124 generates an erase-radii profile. The erase power values for ID, MD and OD stored in table 43 fields 68–72 provide three points of the erase-radii profile. Such three point values are examined for creating a per cent change value (linear slope) that is the erase-radii profile in a constructed embodiment. The calculation is exemplified by the equations below:

For a single erase-radii slope value, only the ID and OD erase power values are used.

$$D\text{-}1 \text{ power} = OD \text{ power} - ID \text{ power} \qquad 1)$$

wherein D-1 indicates a scaler change value for erasing at the disk 10 ID and OD. The OD and ID power terms represent the OD erase power value in field 70 and the ID erase power value in field 68, respectively.

A linear slope value is generated by dividing D-1 power either by a divisor that is the number of revolutions of spiral track 61 between ID and OD or a number of bands between ID and OD of disk 10. The two divisor values are respectively used for changing laser read power level using a given number of spiral track 61 revolutions or at revolution band boundaries. The respective values are stored in range field 78. The range expressed in bands may be one or more bands. Either numerical value may be used.

As an example of relationships revolution count and band count, Table 1 below shows the numerical relationships of one multi-banded optical disk.

TABLE 1

| Band Numbers | Band Radii | Addressable Track Numbers | Disk Revolution Numbers |
|---|---|---|---|
| 0 | 30.00 mm–31.87 mm | 0 to 1,583 | 0 to 1,385 |
| 1 | 31.87 mm–33.74 mm | 1,584 to 3,266 | 1,386 to 2,771 |
| 2 | 33.74 mm–35.61 mm | 3,267 to 5,048 | 2,772 to 4,157 |
| 3 | 35.62 mm–37.48 mm | 5,049 to 6,929 | 4,158 to 5,543 |
| 4 | 37.48 mm–39.36 mm | 6,930 to 8,909 | 5,544 to 6,929 |
| 5 | 39.36 mm–41.23 mm | 8,910 to 10,988 | 6,930 to 8,325 |
| 6 | 41.23 mm–43.10 mm | 10,989 to 13,166 | 8,316 to 9,701 |
| 7 | 43.10 mm–44.97 mm | 13,167 to 15,443 | 9,702 to 11,087 |
| 8 | 44.97 mm–46,84 mm | 15,444 to 17,819 | 11,088 to 12,473 |
| 9 | 46.84 mm–48,71 mm | 17,820 to 20,294 | 12,474 to 13,859 |
| 10 | 48.72 mm–50.58 mm | 20,295 to 22,868 | 13,860 to 15,245 |
| 11 | 50.58 mm–52.45 mm | 22,869 to 25,541 | 15,246 to 16,631 |
| 12 | 52.45 mm–54.32 mm | 25,542 to 28,313 | 16,632 to 18,017 |
| 13 | 54.32 mm–56.20 mm | 28,314 to 31,184 | 28,018 to 19,403 |
| 14 | 56.20 mm–58.07 mm | 31,185 to 34,154 | 29,404 to 20,789 |
| 15 | 58.07 mm–59.94 mm | 34,155 to 37,223 | 20,790 to 22,175 |

The band numbers indicate the bands of spiral track revolutions. The band radii indicates the inner and outer radius of each of the bands. Addressable track number indicate which addressable tracks are in each band. The addressable tracks do not coincide with spiral track 62 revolutions. Disk revolution numbers indicate the spiral track 61 revolutions from ID, the maximum revolution number is at OD.

For a dual or two-segment linear erase-radii profile all three erase values at ID, MD and OD are used. A first or inner segment of the erase-radii profile is created using equation 1) but substituting the MD erase power level for the OD power and substituting the number of spiral track 61 revolutions or the number of revolution bands between ID and MD for the divisor value. Such erase power change slope may be in a range of 7% to 12%, for example, no limitation thereto intended. Machine step 126 copies the calculated erase-radii profile value into field 77 creating a read profile that has the same value as the calculated erase-radii profile. Any scaling of the read profile with respect to the erase-radii profile may be used so long as the erase level of the disk at any radii is not exceeded by the read profile value at the respective radii. The read profile in some situations may be logarithmic. In that instance the value D-1 power is changed logarithmically for producing a curve in the read profile that tends to reduce slope in the outer radial portion adjacent OD.

Machine step 90 for changing laser read power level while the path 13 beam effects scanning a portion of spiral track 61, as next described. Machine step 91 checks on radial changes effected by scanning spiral track 61. Whenever the radius changes from the radius value in current radius field 74 (the radius at which a current laser read power is calculated) exceeds a predetermined radial difference threshold (radial change from one disk revolution to a next revolution, for example), then machine step 93 is activated. Otherwise, machine operations return to machine step 87 for ascertaining whether or not the disk access is continuing.

In machine step 93, smaller machine step 130 compares a current radial position change of light path 13 with a permitted range of radial changes. If the current radial position of light path 13 is within the permitted range, then operations return to machine step 87 for determining whether or not the current disk access is continuing. Such a range may be one revolution group or bands as set forth by Jaquette et al, supra. On the other hand, whenever the radial position change of light path 13 is out of range, then machine step 132 calculates a new power level for the emitted laser 14 beam. Such calculation may use a computing algorithm or be a table look up, such as using Table 1, with an already calculated desired laser power level for each of the revolution groups or bands. Then, in machine step 134, microprocessor 20 updates DAC 23 for changing the read power level. It is to be noted that read operations are often interleaved between write and erase operations. Machine step 134 represents changing the read power level for such interleaved read operations. In this regard, microprocessor 20 stores in table 43 a current value of the DAC 43 setting for read power level as well as for write and erase power levels. From machine step 134, machine operations return to machine step 87.

Each time machine step 89 detects a seek operation, machine step 100 is executed. Machine step 140, within machine step 100, determines whether or not the laser read power level is to be changed during a seek operation. In a simple embodiment, machine step 140 was dispensed with such that machine step 105 is always performed while machine step 108 was not used. In machine step 105, machine step 144 calculates, as above described, a new laser read power level appropriate to the target disk radius. Machine step 146 monitors the seek operation for ascertaining completion of the seek (seek done=yes). At completion of the seek, machine step 148 changes the setting of DAC 23 to the newly calculated laser read power level and updates table 43 in RAM 21. From machine step 148, operations proceed to machine step 87.

From machine step 140, if the laser read power level is to be monitored during a seek, then machine step 152 examines the seek distance by subtracting a target radius from a current radius of light path 13. If the seek distance is "long", then seek radii positions are monitored. If the seek distance is "short" then machine step 105 is executed. In one example of a long seek is that the radial speed of light path 13 moving across disk 10 surface is at a maximum (usually constant maximum) radial speed for a predetermined radial distance, such as across one revolution group or band of a disk. Each long seek includes an acceleration portion, a constant radial speed portion and a deceleration portion. During the acceleration portion no changes are made to the laser read power level while the deceleration portion is treated, for the purposes of controller laser read power level, as a short seek. Any seek distance less than a seek distance requiring a long seek is a short seek.

In this regard, long seeks during the maximum radial speed portion may not sense actual track crossing, rather the track crossings are counted based upon elapsed time or other criteria. During this portion of a long seek, changing laser read power level (or laser track-crossing power level) will not introduce noise into the track crossing count. In any event, machine step 154 monitors current seek disk radii positions. During the acceleration portion of each long seek, machine step 154 never indicates that a new laser read power level is needed. During the constant radial speed portion of a long seek, machine step 156 responds to the generated disk seek radii positions to ascertain, as above described, whether a new laser seek-power level is required. If no, operations return to machine step 154. If yes, then machine step 160 calculates a new laser read power level for the new seek radii. As an alternative to machine step 154, one laser power seek-power level may be calculated for the point in the seek that light path 13 is decelerating to a target track (radius). Machine step 162 stores the new DAC 43 setting in table 43. Machine operations return to machine step 140. During a long seek, after each time laser power level is recalculated, machine step 152 determines whether or not the remaining seek distance has a predetermined portion in a maximum radial speed operation. If not, then the remaining or deceleration portion of the long seek is treated as a short seek wherein machine step 105 is executed.

It is to be understood that the machine operation charts of FIGS. 4 and 5, for purposes of clarity of presentation of the invention illustrate the invention independently of other machine operations that are occurring. As such, in a practical embodiment of the invention, the FIGS. 4 and 5 illustrated machine steps are separated by other machine operations not necessary for an understanding of this invention. Further, the illustrated sequences of machine operations are illustrative and not limitative of practicing the present invention.

While the invention has been particularly shown and described with reference to preferred embodiments thereof, it will be understood by those skilled in the art that various changes in form and details may be made therein without departing from the spirit and scope of the invention:

What is claimed is:

1. In an automatic method of operating an optical device having a data storing member being relatively movable with respect to a laser means that emits a laser read beam, said emitted laser read beam scanning a predetermined recording portion of said data storing member for sensing predetermined machine-sensible indicia on said data storing member, establishing a predetermined number of scan speeds;

including automatic steps of:

operating said laser to emit said laser read beam at any one of a given plurality of laser read power levels, a minimum one of said laser read power levels being a predetermined minimum laser read power level for scanning said predetermined recording portion of said data storing member at a predetermined minimal one of said scan speeds whereat a given energy level per a predetermined scan unit of distance is received by said predetermined recording portion;

increasing said scan speed to a predetermined increased one of said scan speeds that is greater than said minimal one of said scan speeds;

in response to said increasing said scan speed, increasing said laser read power level from said predetermined minimum laser read power level to a first increased one of said predetermined laser read power levels such that said given energy level per said predetermined scan unit of distance is established substantially at said predetermined increased one of said scan speeds;

establishing an erasure profile for said predetermined recording portion that indicates changes with said scan speeds of erasure power level required to erase rewriteable ones of said machine-sensible indicia, and in said adjusting step, for adjusting said laser read power level, combining said erasure profile with said scan speeds for respectively creating said given plurality of said laser read power levels.

2. The method set forth in claim 1, including steps of:

selecting said data storing member to be a rotatable circular optical disk having an annular portion of one surface of said optical disk comprising said predetermined recording portion, said annular portion having two limiting diameters, said limiting diameters comprising an inner diameter and an outer diameter of said annular portion, said annular portion having a recording track means having a plurality of track revolutions respectively at respective radii of said annular portion; and selecting said optical device to be an optical disk device that rotates said optical disk at a constant angular speed such that said predetermined minimum scan speed occurs only at said inner diameter of said annular portion.

3. The method set forth in claim 2, including steps of:

establishing a given plurality of radially spaced-apart given ones of said track revolutions at which said laser read beam power levels are respectively to be changed between respective ones of said given plurality of said laser read power levels; and radially separating said radially adjacent ones of said given ones of said track revolutions by at least one of said track revolutions such that each of said laser read beam power levels is used while scanning a respective plurality of said track revolutions.

4. The method set forth in claim 3, including steps of:

moving said scanning from a current one of said track revolutions disposed at a first one of said radii being scanned using said first increased one of said laser beam power levels to a second one of said track revolutions disposed at a second one of said radii less than said first one of said radii; and responding to said moving said laser beam to said radii to change said laser read power level to one of said laser read power levels having a lower emitted power level than said first increased one of said laser beam power levels.

5. The method set forth in claim 4, including steps of:

establishing a plurality of radially-adjacent bands of said track revolutions; and changing said laser read power between adjacent ones or said radially-adjacent bands.

6. The method set forth in claim 4, including steps of:

at one of said limiting diameters recording an indication of said minimum laser read power and a recorded erasure profile respectively indicating erasure power levels at a predetermined member of said disk radii that respectively correspond to said predetermined ones of said increased scan speeds;

calculating an erasure change profile from said recorded erasure profile; and modifying said laser read power level at each of said predetermined disk radii with respect to said minimum laser read power by changing said laser read at said predetermined disk radii using said erasure change profile.

7. The method set forth in claim 6, including steps of:

moving said laser beam radially toward a target one of said track revolutions from a current one of said track revolutions as a seek operation;

during said seek operation, determining said laser read power level at said target one of said track revolutions; and before scanning said laser read beam along said target one of said track revolutions, changing said laser read power level to said determined laser read power level.

8. The method set forth in claim 7, including a step of:

during said seek operation, changing said laser read power level to said determined laser read power level.

9. An optical device for operating with an optical medium using a laser in the optical device for emitting a read laser beam to be directed to the optical medium for sensing machine-sensible indicia on said optical medium; an improvement including in combination;

laser control means connected to the laser for operating said laser to emit said laser read beam at any one of a given plurality of laser read power levels for scanning a predetermined recording portion of said optical medium, control means connected to said data storing member and to said laser for changing scan speed of said laser read beam with respect to said data storing member;

read power range means indicating an acceptable range of laser read beam impinging energy levels per unit scan distance on said data storing member and a minimum one of said energy levels per unit scan distance;

minimum read beam means in said laser control means for actuating said laser to emit a laser read beam having said minimum one of said laser read power levels for scanning said predetermined recording portion of said data storing member at a predetermined minimal scan speed;

adjusting read beam means in said laser control means and connected to said control means and to said read power range means for responding to changes in said scan speed to increase said laser read power level and to decreases in said scan speed to decrease said read power level such that said given energy level per said unit scan distance is maintained in said acceptable range;

erasure means indicating an erasure profile for said predetermined recording portion that indicates changes with scan speeds of erasure power level required to erase rewriteable ones of said indicia; and said adjusting read beam means connected to said erasure means for responding to said erasure profile for adjusting said laser read power level using said erasure profile for creating said given plurality of said laser read power levels.

10. In the device set forth in claim 9, further including, in combination:

said data storing member being a rotatable circular optical disk having an annular portion of one surface of said optical disk comprising said predetermined recording portion, said annular portion having two limiting diameters, said limiting diameters comprising an inner diameter and an outer diameter of said annular portion, said annular portion having a recording track means having plurality of track revolutions respectively at respective predetermined radii of said annular portion; and said optical device being an optical disk device that rotates said optical disk at a constant angular speed such that said predetermined minimum scan speed occurs only at said inner diameter of said annular portion.

11. In the device set forth in claim 10, further including, in combination:

said optical disk having a given plurality of radially spaced-apart given ones of said track revolutions at which said respective scan speeds represent boundaries of said acceptable ranges whereat said laser read beam power levels are respectively to be changed between respective ones of said given plurality of said laser read power levels; and radially adjacent ones of said given ones of said track revolutions being respectively separated by at least one of said track revolutions such that each of said laser read beam power levels is used while scanning a respective plurality of said track revolutions.

12. The device set forth in claim 11, further including, in combination:

beam positioning means connected to said laser and to said optical disk for moving said laser read beam scanning from a current one of said track revolutions using a predetermined one of said laser beam power levels to a second one of said track revolutions disposed at a predetermined radius requiring a second one of said laser beam power levels; and responding to said moving said laser beam to said second one of said track revolutions to change said laser read beam power level to said required second one of said laser beam power levels before scanning second one of said track revolutions.

13. The device set forth in claim 12, further including, in combination:

said optical disk having a plurality of radially-adjacent bands of said revolutions of said spiral track on said optical disk; and changing said laser read power between adjacent ones of said bands.

14. In the apparatus set forth in claim 12 further including, in combination:

said optical disk at one of said diameters having a machine-sensible indication of said minimum laser read power and said erasure profile;

said erasure means having calculating means for calculating an erasure change profile from said indication of said erasure profile for each of said predetermined radii; and said adjusting read beam means having radius means for adjusting said laser read power level at each of said boundaries of said acceptable ranges using said erasure change profile.

15. The apparatus set forth in claim 14 further including, in combination:

said beam positioning means moving said laser beam radially toward a target track revolution said current track revolution as a seek operation; and said adjusting means having first means, said adjusting means actuating said first means during said seek operation for determining said laser read power level at said target revolution.

16. The device set forth in claim 15, further including, in combination:

said adjusting means having second means connected to said first means for responding to said first means for adjusting said read power level during said seek operation.

17. An optical device for operating with an optical medium using a laser for emitting a read laser beam directed to read machine-sensible indicia in said medium, beam scanning means for scanning said read laser beam across a plurality of said machine-sensible indicia for reading said machine-sensible indicia at any one of a plurality of scan speeds, an improvement comprising:

a laser control means connected to said laser for controlling intensity of said emitted read laser beam;

erasure means connected to said laser control means for indicating respective indicia-erasing power levels for erasing said machine-sensible indicia at said scan speeds;

scan speed indicating means for indicating a current scan speed of said read laser beam across said machine-sensible indicia;

adjusting means connected to said erasure means, scan speed indicating means and said laser control means for responding to said current scan speed and said indicia-erasing power indication for actuating said laser control means to emit a laser beam having a beam intensity less than said indicia-erasing power levels at said plurality of scan speeds, respectively;

said erasure means having power range means for indicating a predetermined range of scan speeds as being acceptable for said laser read beam power levels such that said laser control means is to emit said laser beam at a laser beam read power level within a current range of scan speeds; and said adjusting means responding to said erasure means indicated predetermined range for actuating said laser control means to change said emitted laser read beam level only when a current one of said scan speeds is outside said current range.

18. The device set forth in claim 17, further including, in combination:

seek means connected to said optical medium and said laser for changing said scan speeds of said laser read beam and for indicating a target scan speed; and said adjusting means being connected to said seek means for responding to said indicated target scan speed to actuate said laser control means to change said emitted laser read beam power level.

19. The apparatus set forth in claim 18, further including, in combination:

said optical medium being a rotatable optical disk having a spiral track comprising track revolutions containing said machine-sensible indicia, some of said machine-sensible indicia being indelible while other of said machine-sensible indicia being erasable;

said optical device being an optical disk device for rotating said optical disk at a constant angular speed;

said seek means having beam positioning means for radially moving said laser read beam radially of said optical disk for scanning said spiral track at a changed radius for reading said erasable machine-sensible indicia at said changed radius wherein said scanning speed is changed; and said adjusting means actuating said laser control means during said radial moving to change said laser read beam emitted power level.

20. The apparatus set forth in claim 19, further including, in combination:

said laser control means having writing and erase control means;

said writing and erase control means actuating said laser in time periods interleaved with reading said machine-sensible indicia:

said optical disk having predetermined ones of said indelible machine-sensible indicia indicating said erasure profile and said minimum laser read power level;

sensing means for sensing said machine-sensible indicia; and said erasure means and said adjusting means being connected to said sensing means for respectively receiving said sensed indelible machine-sensible indicia indicating said erasure profiles and said minimum laser read beam power level.

21. The device set forth in claim 20, further including, in combination:

said power range means indicating a plurality of radial ranges for indicating said ranges of scan speeds, respectively, during which said laser read beam power level may be constant, each said indicated range including a respective plurality of said track revolutions.

22. A method of operating an optical device with respect to a data-storing optical medium having machine-sensible indicia for reading said machine-sensible indicia beam scanning means for scanning a laser emitted read beam over said optical medium for accessing said machine-sensible indicia using any one of a plurality of laser read beam scan speeds, including steps of:

providing a medium erasure profile indicating respective indicia-erasing power levels for erasing said machine-sensible indicia at respective ones of said plurality of scan speeds;

indicating a current scan speed of said read laser beam scanning across predetermined ones of said machine-sensible indicia;

responding to said indicated current scan speed and to said erasure profile for actuating said laser to emit a laser beam at said current scan speed having a beam intensity in a predetermined proportion of said current scan speed that is always less than said respective indicated indicia-erasing power levels for said current scan speed;

establishing a plurality of discrete ones of said laser read beam power levels having predetermined changes between respective ones of said discrete ones of said laser read beam power levels;

indicating a predetermined range of scan speeds respectively for said discrete ones of said laser read beam power levels; and in said responding step, changing said laser read beam power level only between said ranges.

23. The method set forth in claim 22, including steps:

establishing a plurality of tracks containing said machine-sensible indicia;

scanning said laser read beam along a length of respective ones of said tracks for respectively sensing said machine-sensible indicia disposed in said tracks, respectively:

while moving said emitted laser read beam from one of said tracks to target one of said tracks, changing said scan speeds from a current scan speed in a current one of said ranges at which said emitted laser read beam power level is a current one of said discrete laser beam power levels to a target scan speed that is in a target one of said ranges of scan speeds for said first one of said discrete laser beam power levels: and before sensing said machine sensible indicia in said target one of said tracks, changing said laser read beam power level from said current one of said discrete laser read beam power levels to said target one of said discrete laser beam power levels.

24. The method set forth in claim 23, including steps:

selecting said optical medium to be a rotatable optical disk having said tracks as respective revolutions of a spiral track;

selecting said optical device to be an optical disk player for rotating said optical disk;

in said radial moving step, moving said laser read beam radially of the optical disk to seek said beam to a target one of said revolutions for changing said scan speeds at respective one of said radii of said optical disk and scanning said spiral track for sensing said machine-sensible indicia; and in said adjusting step, adjusting said laser read beam power level with radial position of the disk while radially moving to said target revolution.

25. The method set forth in claim 24, including steps:

writing data to said optical disk as first predetermined ones of said machine-sensible indicia using a write laser beam power level:

erasing data from said optical disk using an erase laser beam power level to obliterate second predetermined ones of said machine-sensible indicia; and interleaving said writing data, erasing data and sensing data steps.

26. The method set forth in claim 25, including steps:

indicating a plurality of radial ranges of said revolutions as respective power level ranges;

maintaining said laser read beam power level at a constant power level within each said power level range; and performing said adjusting step only when said laser read beam moves between any two of said power level ranges.

\* \* \* \* \*